United States Patent
Fry (10) Patent No.: US 7,035,609 B1
(45) Date of Patent: Apr. 25, 2006

(54) METHOD AND APPARATUS FOR AUTOMATICALLY IDENTIFYING AN ANTENNA CONNECTED TO A RADIO TRANSMITTER AND FOR AUTOMATICALLY CONTROLLING A TRANSMITTER

(76) Inventor: Terry L. Fry, 1068 Governors Bridge, Davidsonville, MD (US) 21035

( * ) Notice: Subject to any disclaimer, the term of this patent is extended or adjusted under 35 U.S.C. 154(b) by 807 days.

(21) Appl. No.: 09/961,944

(22) Filed: Sep. 24, 2001

(51) Int. Cl.
H04B 7/06 (2006.01)

(52) U.S. Cl. .................. 455/200.1; 455/129; 455/193.1

(58) Field of Classification Search ............ 455/115.1, 455/115.2, 115.3, 115.4, 126, 127.1, 127.2, 455/129, 193.1, 200.1, 522–523, 13.3–13.4, 455/63.4, 91, 97, 107; 370/252, 441; 375/295, 375/297

See application file for complete search history.

(56) References Cited

U.S. PATENT DOCUMENTS

| | | | | |
|---|---|---|---|---|
| 5,564,086 A | * | 10/1996 | Cygan et al. ............... | 455/126 |
| 5,826,177 A | * | 10/1998 | Uno ........................... | 455/126 |
| 6,178,310 B1 | * | 1/2001 | Jeong, II ................ | 455/67.11 |
| 6,233,438 B1 | * | 5/2001 | Wynn ......................... | 455/126 |
| 2002/0075189 A1 | * | 6/2002 | Carillo et al. ............... | 343/702 |

FOREIGN PATENT DOCUMENTS

JP 02202237 A * 8/1990

* cited by examiner

*Primary Examiner*—Wing Chan
(74) *Attorney, Agent, or Firm*—Jones, Tullar & Cooper, PC (57) ABSTRACT

A transmission system or apparatus includes a transmitter or source of transmitted RF or microwave power which is selectively connectable via a transmitter connector to an antenna having an antenna feed via an antenna connector so that a variety of antennas with differing characteristics can be used with a given transmitter. Each antenna preferably has a marker or indicating element incorporated into the antenna feed. The marker or indicating element includes a physically measurable property or parameter corresponding to a physical characteristic of the attached antenna. In the preferred embodiment, the indicating element is a resistance connected in parallel with the antenna feed and having a selected resistance value (e.g., in ohms) which indicates the physical characteristic of gain for antenna. The transmission system also includes an indicating element sensor configured to sense or measure the marker or indicating element and generate a transmitter control signal in response to that measurement. The method for automatically generating the control signal can be implemented in programmable steps as computer software and may include use of a Look Up Table (LUT) having a range of indicator element characteristic values and a range of corresponding transmitter control signal values or, alternatively, can include use of a computation sequence which takes an indicator element characteristic value as an input variable and generates a control signal value in response thereto.

37 Claims, 7 Drawing Sheets

METHOD AND APPARATUS FOR AUTOMATICALLY IDENTIFYING AN ANTENNA CONNECTED TO A RADIO TRANSMITTER AND FOR AUTOMATICALLY CONTROLLING A TRANSMITTER

BACKGROUND OF THE INVENTION

1. Field of the Invention

The present invention relates to radio transmitters and regulatory schemes for controlling their use and to methods and apparatus for automatically controlling a radio transmitter, for example, controlling the maximum electric field strength (i.e., in volts per meter) or power density which can be radiated from an antenna connected to the radio transmitter. The present invention also relates to a method and apparatus for automatically identifying an antenna connected to the radio transmitter.

2. Discussion of the Prior Art

Medical professionals and others have expressed concerns over health effects of exposure to Radio Frequency (RF) or microwave electromagnetic radiation. In response, governments and pseudo-governmental regulators around the world have promulgated increasingly complex and rigorous regulations in efforts to minimize such health effects.

Regulators and spectrum resource managers have also been confronted with an increasingly crowded electromagnetic spectrum because users of increasingly varied technologies incorporate wireless radio links into devices which were previously tethered by wires for passing data telemetry or the like.

Generally speaking, sovereigns are not inclined to simply adopt their neighbor's regulatory scheme, no matter how efficacious it may appear to be, and so the result is an ever-changing patchwork of regulatory schemes.

Special license-free bands have been set aside by spectrum management agencies around the world to permit users of low power wireless data telemetry radios to operate wireless links. For example, in the United States, the Federal Communications Commission (FCC) has designated license-free bandwidth segments of the radio frequency spectrum and made them available for industrial, scientific and medical (ISM) uses. In order to minimize problems with electro-magnetic compatibility (EMC) between un-licensed radio transmitters and other radio systems, even more complex and rigorous regulations have been promulgated to control radiation of RF or microwave energy.

To cite a concrete example, referring to the Oct. 1, 1997 edition of Title 47 of the Code of Federal Regulations (47 C.F.R.), U.S. telecommunications regulations, such as 47 C.F. R. §15.245, §15.247 and others, limit maximum peak output power and electric field strength, as measured in units of volts (or millivolts) per meter. Other provisions require that, for certain kinds of installations, if transmitting antennas of directional gain greater than 6 dBi are used, the peak output power from the transmitter or intentional radiator shall be reduced to below set values. For example, systems operating in the 2400–2483.5 MHZ band that are used exclusively for fixed, point-to-point operations may employ transmitting antennas with directional gain greater than 6 dBi, provided the maximum peak output power of the intentional radiator is reduced by 1 dB for every 3 dB that the directional gain of the antenna exceeds 6 dBi.

Section 15.249 provides that transmission within the ISM bands, 902–928 MHZ, 2400–2483.5 MHZ and 5725–5875 MHZ shall be limited in electric field strength to 50 millivolts per meter at the fundamental frequency, and at 24.0–24.25 GHz shall be limited to 250 millivolts per meter at the fundamental frequency. Field strength limits are specified at a distance of 3 meters and the field strength of harmonics must be less than or equal to one hundredth the limit set for the fundamental frequency (e.g., at 902 MHZ, 500 microvolts per meter for harmonics).

A number of modern wireless data transmission systems can be configured for use with more than one antenna. Section 15.203 requires that a "unique coupling" be used to "ensure that no antenna other than that furnished by the responsible party shall be used with the device." Apart from "professional installations", the only alternative compatible with the techniques of the prior art under this regulatory scheme is use of a permanently attached antenna. The regulatory scheme therefore requires a wireless data transmission system vendor to try to anticipate the mischief of the user.

If antennas having a variety of efficiencies or directivities are to be employed by a user, then observing the maximum field strength or peak power limitations set forth by the regulations in the various jurisdictions can become a cumbersome problem requiring time consuming adjustment of transmitter output power for each application. At present, the most straightforward way to do this is to have a competent RF technician calculate the maximum field strength for a given antenna/transmitter combination and then de-power or attenuate the transmitter RF power output for a given antenna's gain. This process makes it difficult and expensive to design and field wireless data transmission systems.

There is a need, therefore, for a method to comply with the world-wide patchwork of regulatory schemes controlling RF and microwave radiation; preferably, the method does not require the wireless data transmission system vendor to send along that increasingly hard to find competent RF technician.

OBJECTS AND SUMMARY OF THE INVENTION

Accordingly, it is a primary object of the present invention to overcome the above mentioned difficulties by automatically detecting a marker or indicator of a physical characteristic of an antenna (e.g., which may be related to gain or directivity) and, if necessary, controlling the transmitter (e.g., changing the maximum power radiated via that antenna) in response to the detection.

Another object of the present invention is to provide a method and apparatus for automatically controlling maximum electric field strength or power density radiated via an antenna of selected gain or directivity.

Another object of the present invention is to automatically decrease maximum power radiated via an antenna of selected gain or directivity upon detecting a marker or indicator of a physical characteristic of that antenna.

Another object of the present invention is to automatically disable a radio transmitter upon detecting that an antenna of unknown gain or directivity has been connected to the radio.

The aforesaid objects are achieved individually and in combination, and it is not intended that the present invention be construed as requiring two or more of the objects to be combined unless expressly required by the claims attached hereto.

In accordance with the present invention, a transmission system or apparatus includes a transmitter or source of transmitted RF or microwave power which is selectively connectable via a transmitter connector to an antenna having an antenna feed via an antenna connector. The transmitter to antenna connection optionally passes power through the antenna via coaxial cable and through connectors (e.g., such as "N connectors" or "BNC connectors") which are preferably removable from one another so that a variety of antennas with differing gain characteristics can be used with a given transmitter.

Each antenna preferably has a marker or indicating element incorporated into the antenna feed. The marker or indicating element includes a physically measurable property or parameter corresponding to a physical characteristic of the attached antenna. In the preferred embodiment, the indicating element is a resistance connected in parallel with the antenna feed and having a selected resistance value (e.g., in ohms) which indicates the physical characteristic of gain for antenna. Gain, as used herein, is understood to include both antenna directivity and antenna efficiency.

The transmission system also includes an indicating element sensor configured to sense or measure the marker or indicating element and generate a transmitter control signal in response to that measurement. In the preferred embodiment, the transmitter control signal is a transmitter output power control signal.

A transmitter controller receives the transmitter control signal and, in response thereto, controls the transmitter. The transmitter is preferably adjustable and has a selectively variable output power which is adjustable in response to the output power control signal.

In a first embodiment of the method of the present invention, the output power is continuously adjustable through a range of values, and once the antenna's marker or indicating element is sensed, the transmitter controller generates an output power control signal corresponding to a maximum permissible electric field strength or power density to be radiated from the connected antenna, according to a selected regulatory scheme. The transmitter receives the transmitter control signal and, in response thereto, generates a transmitter RF output of precisely that power level to radiate at the selected maximum permissible electric field strength or power density through the connected antenna.

In a second embodiment of the method of the present invention, the output power is also controllable or switchable to a disabled state, wherein the transmitter is effectively disabled and radiates zero power. When the indicating element sensor senses that a connected antenna lacks an indicating element or senses an indicating element corresponding to an inappropriate antenna, the transmitter controller generates an output power control signal corresponding to the disabled state, wherein the transmitter is effectively disabled and radiates zero power through the connected antenna.

The marker or indicating element preferably incorporated into the antenna feed can be configured as a resistance network having a selected resistance, as noted above, or can be configured as a diode bridge having a selected voltage-current (VI) characteristic. Alternatively, the indicating element can be configured as a tuned inductor-capacitor (LC) circuit having a selected cutoff or center frequency. In each embodiment, the indicating element has a physically sensible characteristic which lies within a selected range of possible values to provide a range of values corresponding to a range of parameter values for the antennas to be connected to the transmitter. Thus, for example, when using a resistor as an indicating element, for an assortment of antennae having gain parameter values ranging from 3 dBi (i.e., 3 dB above that for an Isotropic pattern) to 9 dBi, resistance values in a corresponding range of, for example, 3 Meg-Ohms (MΩ) to 9 MΩ will suffice. In an exemplary embodiment of the present invention, an antenna with a gain of 3 dBi incorporates a 3 MΩ resistor across the antenna feed (as an indicating element) and is connectable to a transmitter capable of generating a transmitter output (at 2435 MHZ) of a peak or first power level such that, with an 0 dBi antenna, the observed field strength is 500 millivolts/meter at three meters. In use, the three MΩ resistor indicating element's resistance characteristic is automatically sensed, and, in response, the transmitter controller automatically generates an output power control signal corresponding to a second power level 3 dB below the first power level. In this case, the second power level corresponds to the maximum permissible electric field strength to be radiated through the connected antenna, according to the exemplary regulatory scheme set forth in U.S. regulation 47 C.F.R. §15.245(a). The transmitter receives the transmitter control signal and, in response thereto, generates a transmitter RF output of 3 dB below the first power level to radiate though the connected antenna at the selected maximum permissible electric field strength through the connected antenna, i.e., 500 millivolts per meter.

The method for automatically generating an output power control signal corresponding to a second selected power level can be implemented in programmable steps as computer software and may include use of a Look Up Table (LUT) having a range of indicator element characteristic values and a range of corresponding output power control signal values or, alternatively, can include use of a computation sequence which takes an indicator element characteristic value as an input variable and generates an output power control signal value in response thereto.

In an alternative embodiment of the method of the present invention, no physical, lumped indicating element or tag is added to the antenna feed, but a distributed characteristic such as characteristic impedance match or Voltage Standing Wave Ratio (VSWR) of the antenna and feed structure are measured in and around the intended frequency band. For example, a high gain Yagi-Uda array will have a fairly narrow band of frequencies exhibiting an acceptable impedance match over the intended band. A low gain Yagi-Uda array, on the other hand, will exhibit a much wider matched band width and so one may sense which of the two types of Yagi-Uda arrays is connected and, for example, detect the identity and gain of the antenna, without a unique tag or indicating element being physically incorporated into the antenna. This method requires a measurement at the transmitter end of the coax connecting the transmitter to the antenna, and is dependant on the type of antenna and feed. Different antennas of the same configuration can be measured to determine VSWR as a function of frequency, to generate a plot. A bi-directional coupler receives input energy from the transmitter and reflected energy from the antenna, and in accordance with this embodiment of the method of the present invention, a VSWR measurement is taken to determine the impedance match as a function of frequency, to generate the characteristic plot; the applicant has determined that a measurement of VSWR/impedance match as a function of frequency provides sufficient resolution to make an identification between two antennae. As a preliminary step, one must measure or otherwise learn certain physical characteristics pertaining to a selected antenna; preferably, the physical characteristics will include gain and VSWR/impedance match as a function of frequency. If a given system application will require an end user to choose from among, for example, three antennae, then the physical characteristics will have to be determined in advance for each of the three selected antennae. Accordingly, the method for this embodiment (where the sensed parameter is antenna VSWR) is somewhat more complex than the simpler methods used in sensing a lumped circuit indicating element such as a resistor-type gain indicating element. In the band of use for the antenna, a signal is generated and transmitted via a bi-directional coupler for measuring the transmitted power going out and the reflected power coming back from the antenna.

The method of sensing the physical characteristic of VSWR/impedance match as a function of frequency is preferably implemented in a software algorithm resident in the transceiver or, more particularly, in a controller. The transmitter preferably includes a source for a swept frequency signal, a transmitted power sensor connected to the bi-directional coupler's transmitted power sampling port and a reflected power sensor connected to the bi-directional coupler's reflected power sampling port, to perform a special kind of reflectometry. In taking the measurement, a frequency sweep at low power is performed to generate the different data points needed to generate a VSWR plot and determine the spectral width of good VSWR match. In practice, the software algorithm controls the swept frequency signal source to generate each of a number of selected frequencies sequentially; transmitted and reflected power are measured at each frequency and those data points are used to make a determination about the bandwidth of the good VSWR match. This determination on the width of good match is used to identify the connected antenna.

Preferably, the software algorithm programmed to control the transmitter uses the antenna identification information in an algorithm including the following steps: if the connected antenna is recognized as an antenna that can be used, then the transmitter is enabled, whereas if the connected antenna is not recognized as an antenna that can be used, the transmitter is disabled and, preferably, a fault LED is illuminated to alert the user of an antenna fault.

Alternatively, the software algorithm programmed to control the transmitter uses the antenna identification information as follows: for a given VSWR frequency bandwidth parameter W, a selected peak transmitter power is selected and the transmitter output power is adjusted to radiate only that selected amount of power from the antenna, thus controlling the maximum electric field strength or power density.

Alternatively, an in-line directional coupler is inserted in series with the transmitter output, and outgoing power is measured and used as part of a feedback control system for adjusting outgoing power.

The method and system of the present invention is also well suited for use with waveguide structures; in an exemplary embodiment, a waveguide segment for use as an antenna feed includes first and second iris aperture panel indicating elements disposed within the waveguide. Alternatively, a waveguide segment antenna feed includes an inwardly projecting post-shaped narrow-band filter indicating element disposed within the waveguide. Typical wave guide (e.g., rectangular wave guide) is useful over a bandwidth spanning approximately 40% of the desired center frequency, and the indicating element or tag element is configured a resonant or tuned structure disposed in the wave guide physical structure that can be sensed. Given that wave guide is not often used over more than 5% of that 40% for a dedicated application, the resonant structure configured inside the wave guide permits transmitter operation at the desired center frequency in an embodiment which provides a narrow pass band, e.g., 7 to 10% of what would otherwise have been a 40% bandwidth generously centered on the intended 1 to 4% of the frequency band being used by the transmitter. Detection of VSWR for the narrowed passband is then used for antenna identification.

The above and still further objects, features and advantages of the present invention will become apparent upon consideration of the following detailed description of specific embodiments thereof, particularly when taken in conjunction with the accompanying drawings, wherein like reference numerals in the various figures are utilized to designate like components.

DESCRIPTION OF THE PREFERRED EMBODIMENT

Figure 1:
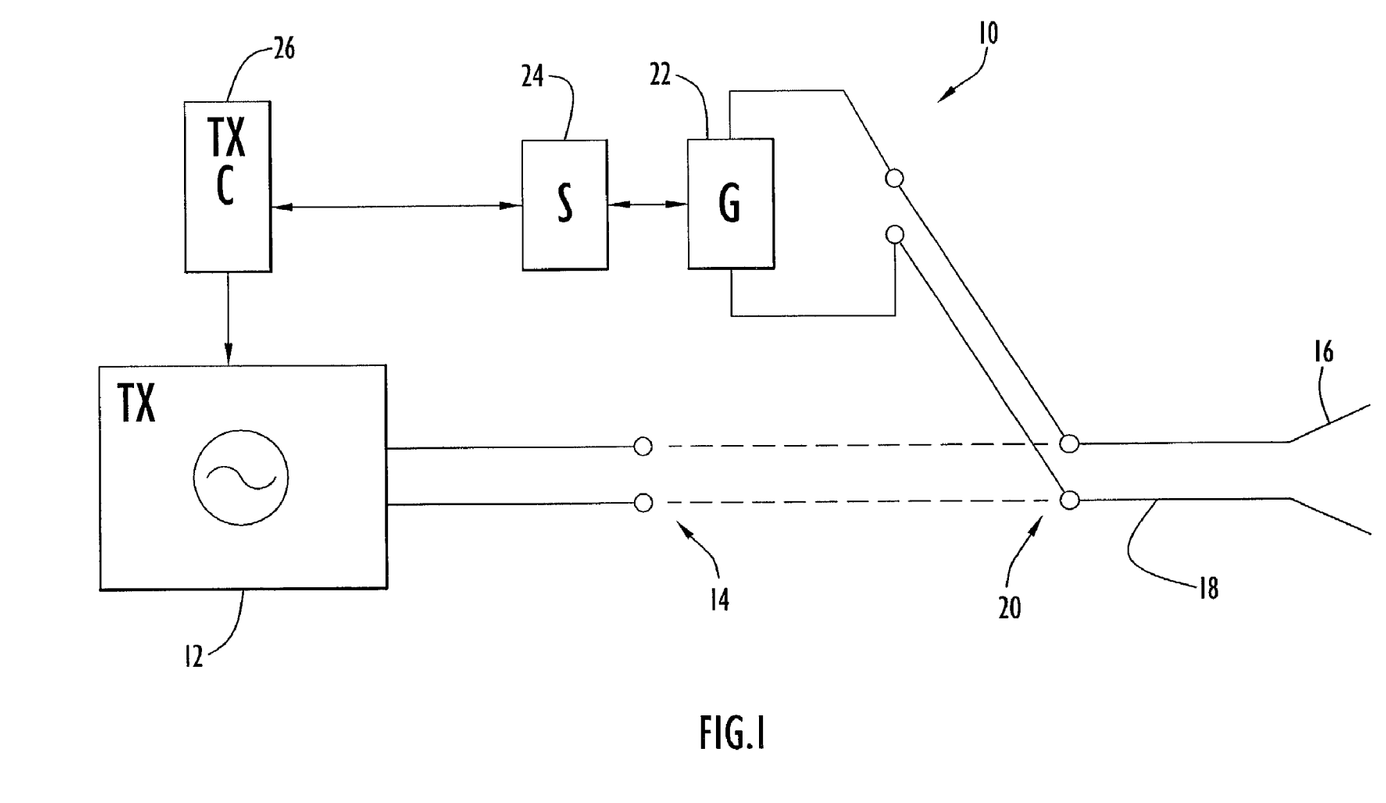
FIG. 1 is a schematic diagram of a transmission system or apparatus for automatically controlling maximum electric field strength or power density radiated via an antenna of selected gain or directivity, in accordance with the present invention.

Turning now to FIG. 1, in accordance with the present invention, a transmission system or apparatus 10 includes a transmitter or source of transmitted RF power connectable to an antenna, for example, via transmitter connector 14. System 10 also includes an antenna 16 having an antenna feed 18 electrically connected to an antenna connector 20. Transmitter connector 14 and antenna connector 20 are adapted to connect to one another as is well known in the art. For example, transmitter 12 may transmit power through antenna 16 via connectors 14, 20 (e.g., known as "N connectors" or "BNC connectors") over coaxial cable. Connectors 14 and 20 are preferably selectively removable from one another so that a variety of antennas with differing physical characteristics can be used with a given transmitter.

Antenna 16 preferably has incorporated into antenna feed 18 a tag, marker or indicating element 22 which includes a physically measurable property or parameter corresponding to a physical characteristic of the attached antenna 16. In the preferred embodiment, the indicating element 22 includes a series resistance having a selected resistance value in ohms which indicates the physical characteristic of gain for antenna 16.

Gain, as used herein, is understood to mean a combination of antenna directivity and efficiency. Indicating element 22 may also be referred to as a tag or marker, and serves to indicate the identity of antenna 16.

Transmission system 10 further comprises an indicating element sensor 24 configured to measure indicating element 22 and generate a transmitter control signal in response to that measurement. In the embodiment illustrated in FIG. 1, the transmitter control signal is a transmitter output power control signal.

A transmitter controller 26 is responsive to the transmitter control signal generated and indicating element sensor 24 and, in response thereto, controls transmitter 12. Transmitter 12 is preferably adjustable and has a selectively variable output power which is preferably adjustable in response to the output power control signal.

In a first embodiment of the method of the present invention, the output power is continuously adjustable through a range of values, and once the indicating element 22 is sensed, the transmitter controller 26 generates an output power control signal corresponding to a maximum permissible electric field strength or power density to be radiated through connected antenna 16, e.g., in conformance to a selected regulatory scheme. Transmitter 12 receives the transmitter control signal and, in response thereto, generates a transmitter RF output of precisely that power level to radiate at the selected maximum permissible electric field strength through connected antenna 16.

In a second embodiment of the method of the present invention, the output power is also controllable or switchable to a disabled state, wherein transmitter 12 is effectively disabled and radiates zero power. If indicating element sensor 24 senses that a connected antenna lacks an indicating element or senses an indicating element corresponding to an inappropriate antenna, transmitter controller 26 generates an output power control signal corresponding to the disabled state, wherein transmitter 12 is effectively disabled and radiates zero power through the connected antenna.

Figure 2A:
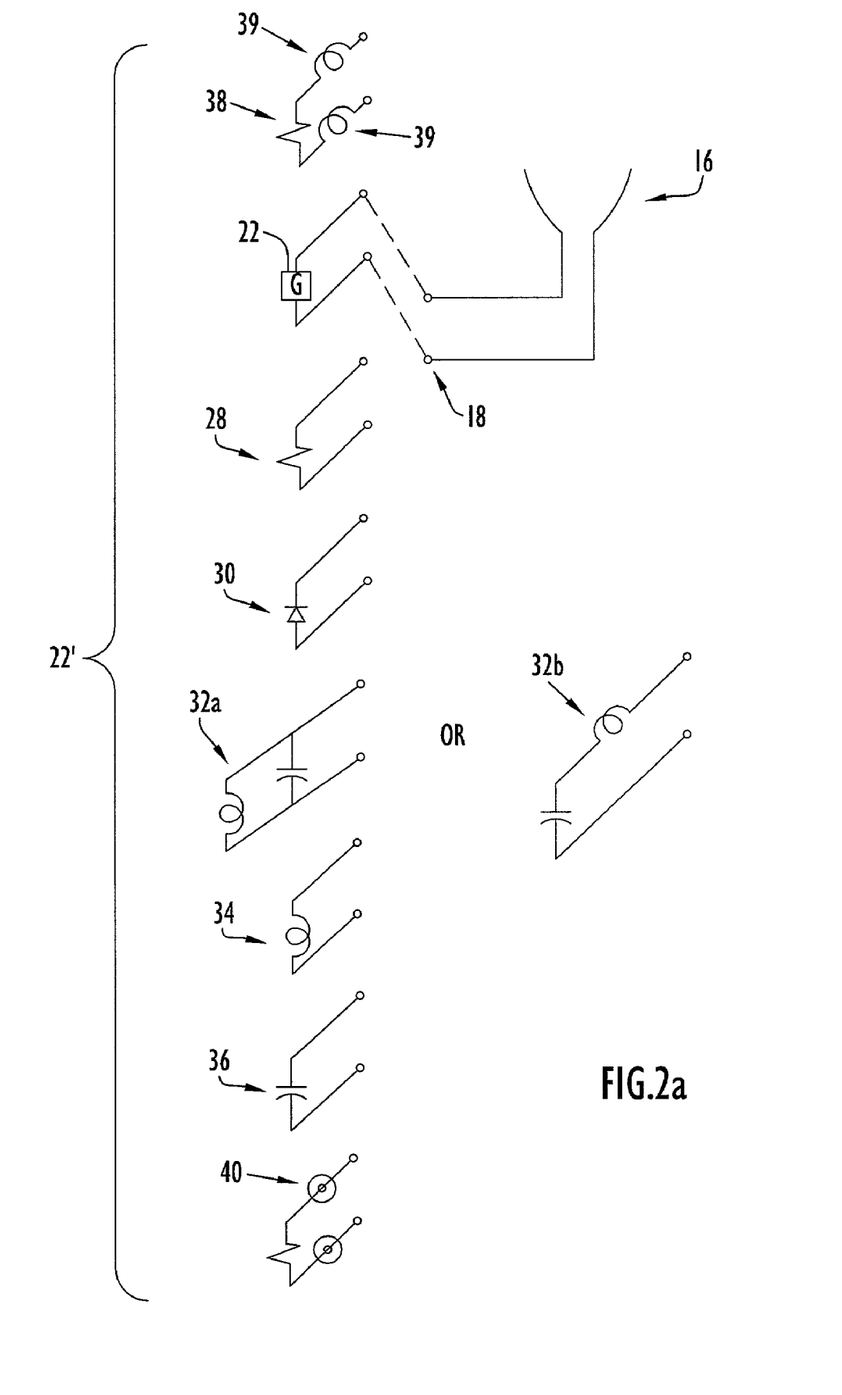
FIG. 2a is a schematic illustration of an antenna with an array of indicating elements configured in parallel for use therewith, in accordance with the present invention.
Figure 2B:
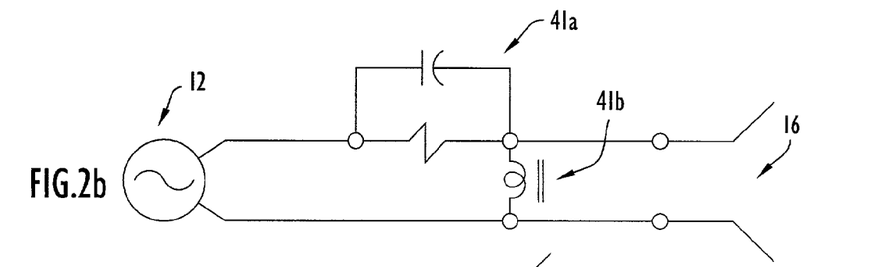
FIGS. 2b–2g are schematic illustrations of antennae with a variety of indicating elements configured in series for use therewith, in accordance with the present invention.
Figure 2C:
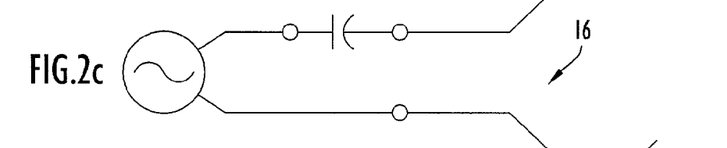
Figure 2D:
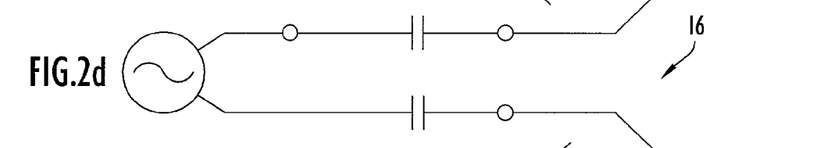
Figure 2E:
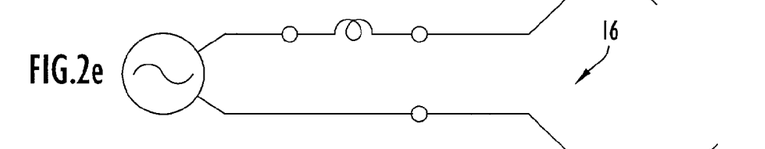
Figure 2F:
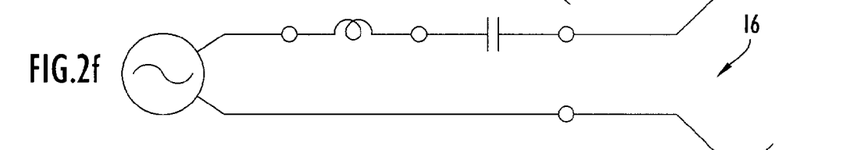
Figure 2G:
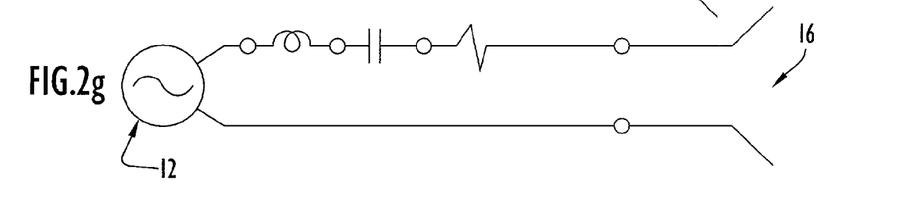

As shown in FIG. 2a, indicating element 22 is preferably incorporated into antenna feed 18 but, more generally, can be configured as any one of the array of choices shown as 22', and so can be a resistance network 28 having a selected resistance (e.g., 300 ohms), as noted above, or can be configured as a single diode 30 or diode bridge circuit having a selected voltage-current (VI) characteristic. Alternatively, the indicating element can be configured as a tuned inductor-capacitor (LC) circuit 32a or 32b having a selected cutoff or center frequency. The indicating element can also be configured as an inductor 34, a capacitor 36 or a resistance circuit including one or more ferrite bead chokes 40, preferably on the resistor leads. While the indicating elements illustrated in FIG. 2a are arranged for parallel or shunt connection, it is also possible to incorporate an indicating element in a series connection, as shown in FIGS. 2b–2g, each illustrating a selected indicating element in series with the feed of an antenna 16. For example, as shown in FIG. 2b, a series connected bypass RC network 41a can be used with a shunt choke 41b to provide an indicating element having a selected physically sensible characteristic. FIGS. 2c–2g illustrate other series connected indicating elements connected in series with one or both terminals of the feed for antenna 16. Those of skill in the art will appreciate that any of the indicating elements 22' illustrated in FIG. 2a can also be used in a series connection with one or both of the antenna feed terminals.

In each of the embodiments illustrated in FIGS. 2a through 2g, the indicating element or tag has a physically sensible characteristic (e.g. resistance in ohms) which lies within a selected range of possible values to provide a range of values corresponding to a range of known parameter values for the antennas to be connected to the transmitter (e.g., gain, directivity or efficiency) and usable to indicate antenna identity. Thus, when using a parallel resistor 28 as an indicating element, for an assortment of antennae having gain parameter values ranging from 3 dBi (i.e., 3 dB above that for an Isotropic pattern) to 9 dBi, resistance values in a corresponding range (e.g., 3 Mega-Ohms (MΩ) to 9 MΩ) will suffice. Resistor 28 preferably has a resistance value in the range of 200 ohms to several MΩ.

In an exemplary embodiment of the present invention, an antenna (e.g., 16) with a gain of 3 dBi incorporates a 3 MΩ resistor across the antenna feed 18 (as an indicating element) and is connectable to a transmitter capable of generating a transmitter output (at 2435 MHZ) with a first power level such that, with an antenna having a gain of 0 dBi, the observed field strength is 500 millivolts/meter at three meters. In use, the three MΩ resistor indicating element's resistance characteristic is automatically sensed, and, in response, transmitter controller 26 automatically generates an output power control signal corresponding to a second power level 3 dB below the first power level. In this case, the second power level corresponds to the maximum permissible electric field strength to be radiated through the connected antenna, according to a regulatory scheme (e.g., as set forth in the example cited above, U.S. regulation 47 C.F.R. §15.245(a)). Transmitter 12 receives the transmitter control signal and, in response thereto, generates a transmitter RF output of 3 dB below the first power level to radiate though the connected antenna at the selected maximum permissible electric field strength from the connected antenna (i.e., 500 millivolts per meter, for the exemplary regulation).

The method for automatically generating an output power control signal corresponding to a second selected power level is preferably implemented in programmable steps as computer software preferably stored in controller 26 and may include use of a Look Up Table (LUT) having a range of indicator element characteristic values and a range of corresponding output power control signal values or, alternatively, can include use of a computation sequence which takes an indicator element characteristic value as an input variable and generates an output power control signal value in response thereto.

In general terms, the physical characteristic of indicating element 22 (e.g., resistance in ohms of resistor 28) is analogous to a code, where each indicating element sensed value corresponds to a distinct code entry in the Look Up Table stored in controller 26. Accordingly, a first resistance value (e.g., 200 ohms) may correspond to a code entry indicating an omnidirectional antenna, whereas a second resistance value (e.g., 1000 ohms) may correspond to a code entry in the Look Up Table indicating a highly directional (e.g., helical) antenna.

The leads of a particular gain indicating element may be formed or wound into coils by helically winding the leads themselves, as shown in FIG. 2 (e.g., the R/L circuit 38 with first and second coiled leads 39). Thus, almost any of the indicating elements illustrated in FIG. 22 can be augmented with helically wound leads to provide a tunable circuit corresponding to a given code entry for storage in a Look Up Table in controller 26.

The resonant circuits (e.g., 32) used in the gain indicating elements preferably have frequencies of interest which are widely separated in spectrum from the antenna's frequency of intended use. Alternative embodiments for gain indicating elements include crystal oscillating elements (as used in crystal radios) or surface acoustic wave (SAW) resonators having selected frequency characteristics.

Figure 3:
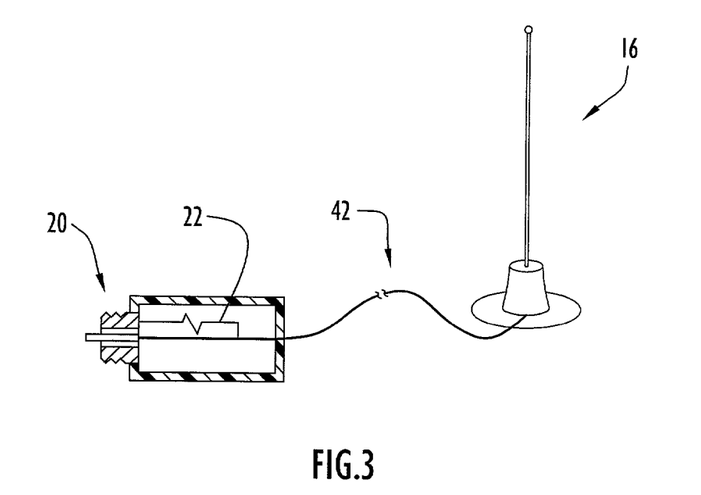
FIG. 3 is a schematic illustration of an antenna with an indicating element configured as part of a connector housing connected through an antenna cable for use therewith, in accordance with the present invention.

As noted above, antenna 16 preferably has marker or indicating element 22 incorporated into antenna feed 18 to provide a unitary structure. In the embodiment illustrated in FIG. 3, antenna 16 is electrically connected to antenna connector 20 via an antenna cable 42 terminated in a housing or enclosure 44 which protects and conceals indicating element 22.

Figure 4:
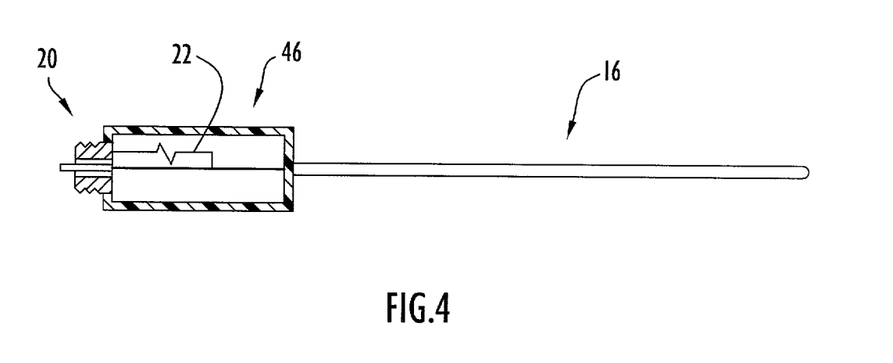
FIG. 4 is a schematic illustration of an antenna with an indicating element configured as part of an antenna base enclosure for use therewith, in accordance with the present invention.

In the embodiment illustrated in FIG. 4 the base 46 of antenna 16 may be molded or potted in an elastomer or polymer enveloping indicating element 22 as part of an integral unitary base structure 46. Antenna base structure 46 preferably is integrally formed with antenna connector 20 on a first end.

Alternatively, antenna 16 need not be galvanically connected to antenna connector 20 for direct passing of electron flow but can instead be coupled through a capacitive coupler, a transformer, an inductive coupler, or via an RF structure employing, for example, a circulator, an isolator or a directional coupler.

Transmitter controller 26 or transmitter 12 may include one or more light emitting diodes (LEDs) actuated by a control signal to indicate whether an appropriate antenna is connected to the transmitter or whether an inappropriate antenna has been detected, in which case the transmitter is disabled. For example, in a system having three antennas intended for use with a given transmitter, a four LEDs are included to indicate which of the range of antennas is connected. The four LEDs are of selected colors and controller 26 is programmed to generate LED actuation signals indicating whether antenna 1 (green LED), antenna 2 (green LED), antenna 3 (green LED) or no appropriate antenna (red LED), respectively, are connected.

As noted above, for designated bands under some regulatory schemes, for selected installations such as fixed, point-to-point operations, transmitting antennas with directional gain greater than a standard gain (e.g., 6 dBi, as set forth in 47 C.F.R. §15.247) can be utilized, provided that the maximum peak power output of the transmitter is reduced by 1 dB for every 3 dB that the directional gain of the antenna exceeds the standard gain, e.g., 6 dBi. In an alternative embodiment of the method of the present invention, each antenna includes as part of antenna feed 18 at least one indicating element 22 specifying the directional gain of the antenna. In this alternative method, a Look Up Table stored in controller 26 includes the values by which the power of transmitter 12 must be reduced for every increment of directional gain above the standard gain.

Figure 5:
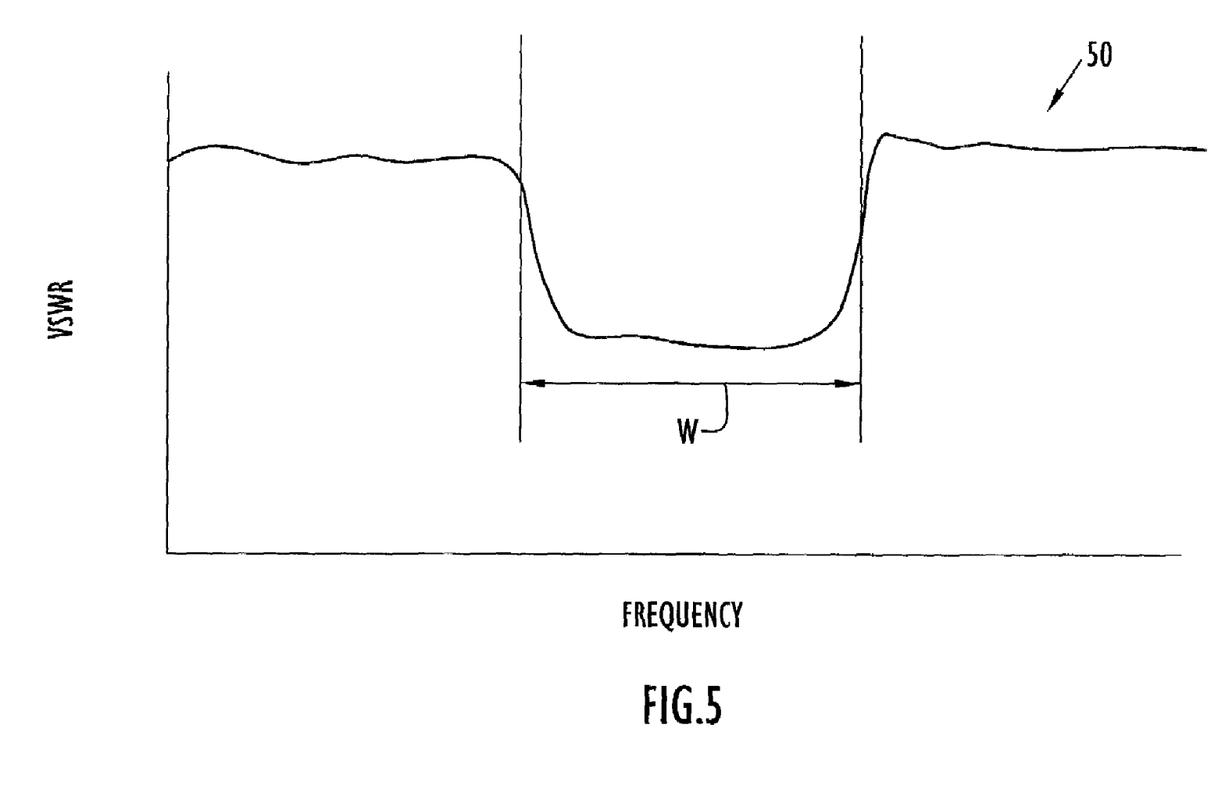
FIG. 5 is a diagram illustrating the plotted Voltage Standing Wave Ratio (VSWR) performance of an antenna feed which provides a tuned response to be sensed at the transmitter, wherein VSWR changes as a function of transmitter frequency, in accordance with the present invention.
Figure 6:
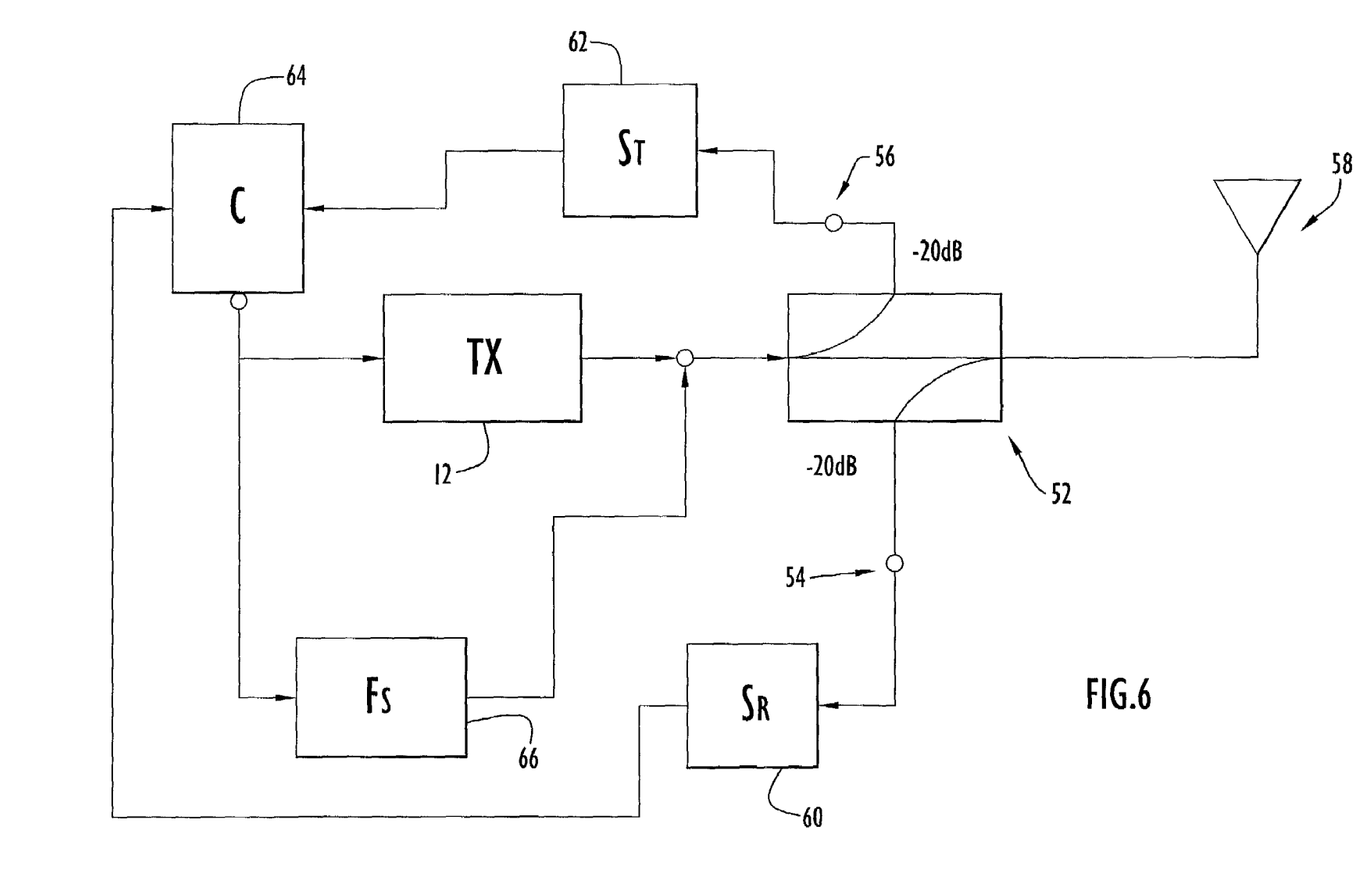
FIG. 6 is a schematic illustration of an antenna feed equipped with a bi-directional coupler permitting measurement of a tuned response at the transmitter wherein VSWR changes as a function of transmitter frequency, in accordance with the present invention.

And now, turning to another embodiment, FIG. 5 is a diagram illustrating the performance of an antenna feed providing a tuned response to be sensed at the transmitter wherein VSWR changes as a function of transmitter frequency, and FIG. 6 is a schematic diagram illustrating an antenna feed connected with a bi-directional coupler permitting measurement of a tuned response at the transmitter wherein VSWR changes as a function of transmitter frequency.

The above described detection methods for determining a unique identity for any given antenna include physically measuring a variety of lumped indicating elements such as measuring resistors, diode bridge voltage drops (either standard diodes or Zener diodes) and frequencies of one or more tuned circuits (e.g., LC circuits resonating out of band for the antenna's intended frequency of use). In an alternative embodiment of the method of the present invention, no physical, lumped indicating element or tag is added to the antenna, but a distributed characteristic such as characteristic impedance as a function of frequency is measured in and around the intended frequency band.

Preferably, the impedance match or the Voltage Standing Wave Ratio (VSWR) of the antenna and feed structure are measured in and around the intended frequency band.

For example, a high gain Yagi-Uda array will have a fairly narrow band of frequencies exhibiting an acceptable impedance match over the intended band. A low gain Yagi-Uda array, on the other hand, will exhibit a much wider matched band width and so one may sense which of the two types of Yagi-Uda arrays is connected and, for example, detect the identity and gain of the antenna, without a unique tag or indicating element being physically incorporated into the antenna. This method requires a measurement at the transmitter end of the coax connecting the transmitter to the antenna, and is dependant on the type of antenna and feed. Turning now to FIGS. 5 and 6, different antennas of the same configuration can be measured to determine VSWR as a function of frequency, to generate a plot 50 as shown in FIG. 5. A bi-directional coupler 52, as shown in FIG. 6, receives input energy from transmitter 12 and reflected energy from antenna 16. In accordance with this embodiment of the method of the present invention, a VSWR measurement is taken to determine the impedance match as a function of frequency, to generate a characteristic plot 50 as shown in FIG. 5; the applicant has determined that a measurement of VSWR/impedance match as a function of frequency provides sufficient accuracy to make an identification between two antennae.

While there is a window of uncertainty as to the repeatability of such measurements, if one is, for example, solely trying to detect the difference between a 9 dBi Yagi-Uda array and a 16 dBi Yagi-Uda array, the use of the bi-directional coupler of FIG. 6 will permit a VSWR measurement of sufficient accuracy to make an identification between the two antennae. One can probably also resolve the difference between a 9 dBi Yagi-Uda array and a 12 dBi Yagi-Uda array. However, at present, applicant has not reliably demonstrated the capability resolve the difference between a 8 dBi Yagi-Uda array and a 9 dBi Yagi-Uda array. Resolution of about three dBi or greater should be achieved with at least ninety percent certainty. Other types of antennae can also be identified using this embodiment of the method of the present invention, i.e., by just measuring the quality of match of the antenna and the band over which that match exists. This method is useful with any antenna and requires no unique tagging feature to be incorporated into the antenna itself. As a preliminary step, one must measure or otherwise learn certain physical characteristics pertaining to a selected antenna; preferably, the physical characteristics will include the gain and VSWR/impedance match as a function of frequency plot. If a given system application will require an end user to choose from among, for example, three antennae, then the physical characteristics will have to be determined in advance for each of the three selected antennae. The method of the present invention will not permit one to take an antenna never seen before and, having no measured data, look at only the match and determine the gain of the antenna.

Accordingly, the method for this embodiment (where the sensed parameter is antenna VSWR) is somewhat more complex than the simpler methods used in sensing a lumped circuit indicating element such as resistor-type gain indicating element 28. In the band of use for antenna 58, a signal is generated and transmitted via a bi-directional coupler 52 for measuring the transmitted power going out via transmitted power sampling port 56 and the reflected power coming back via reflected power sampling port 54. By measuring the power coming back from antenna 58, a good measure of the match band width (i.e., "W" as shown in FIG. 5) of antenna 58 is detected. Where antenna 58 is well matched and radiating power, not much energy comes back to be measured on the coupler reflected power sampling port 54, and when the energy transmitted to antenna 58 is out of band and the match is poor, more energy comes back to be measured on the coupler reflected power sampling port 54.

Bi-directional coupler 52 is similar to a standard directional coupler but differs in that it is a four-port device of the type used in reflectometry. The energy diverting or coupled paths (referred to above as reflected power sampling port 54 and transmitted power sampling port 56) divert a small amount of energy from the straight through path, and are referred to as being a selected number of dB down from the straight through path. Reflected power sampling port 54 and transmitted power sampling port 56 can be 3 dB down, 15 dB down, 20 dB down (as shown) or 30 dB down. Preferably, the coupled paths are 20 dB down as compared to the main path through (i.e., to the antenna) and power reflected from the antenna is preferably also 20 dB down from the reflected signal which of course has experienced some loss through the co-action and some loss out through the antenna. The ratio of coupled energy is preferably not so large as to diminish sensitivity and is not so small as to provide insufficient signal for measurement. There is a presumption that the system will not employ an excessive amount (e.g., 500 feet) of coaxial cable between the transmitter and the antenna.

The method of sensing the physical characteristic of VSWR/impedance match as a function of frequency is preferably implemented in a software algorithm resident in the transceiver or, more particularly, in controller 64. Transmitter 12 preferably includes $F_s$, a source for a swept frequency signal 66, ST, a transmitted power sensor 62 connected to transmitted power sampling port 54 and SR, reflected power sensor 60 connected to reflected power sampling port 54. In taking the measurement, a frequency sweep at low power is performed to generate the different data points needed to generate VSWR plot 50 to determine the spectral width of good VSWR match W. In practice, the software algorithm controls swept frequency signal source 66 to generate each of a number of selected frequencies sequentially, transmitted and reflected power are measured at each frequency and those data points are used to make a determination about the width W of the good VSWR match. This determination on the width of good match W is used to identify the connected antenna 58.

Preferably, the software algorithm programmed to control the transmitter uses the antenna identification information in algorithm including the following steps: if the connected antenna is recognized as an antenna that can be used, then the transmitter is enabled, whereas if the connected antenna is not recognized as an antenna that can be used, the transmitter is disabled and, preferably, a fault LED is illuminated to alert the user of an antenna fault.

Alternatively, the software algorithm programmed to control the transmitter uses the antenna identification information as follows: for a given VSWR frequency width parameter W, a selected peak transmitter power is selected and the transmitter output power is adjusted to radiate only that selected amount of power from the antenna, thus controlling the maximum electric field strength or power density.

Alternatively, an in-line directional coupler is inserted in series with the transmitter output, and outgoing power is measured and used as part of a feedback control system for adjusting outgoing power.

Figure 7:
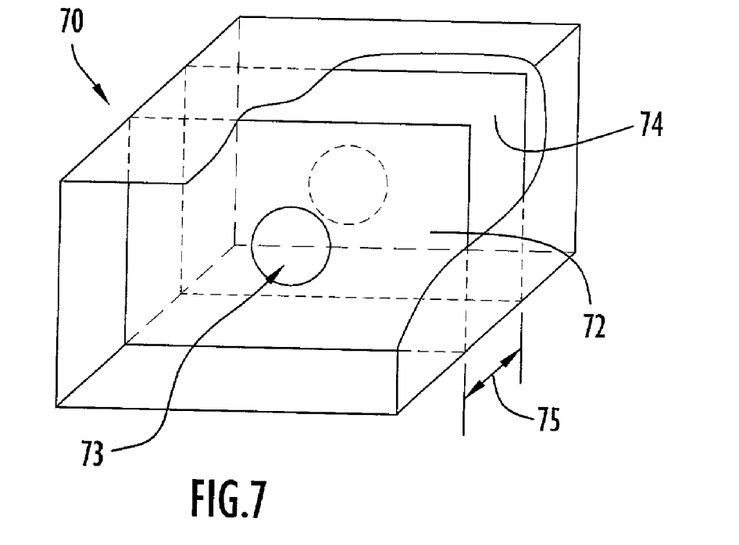
FIG. 7 is a schematic illustration of a waveguide segment, (e.g., an antenna feed) with first and second iris indicating elements disposed within the waveguide, in accordance with the present invention.
Figure 8:
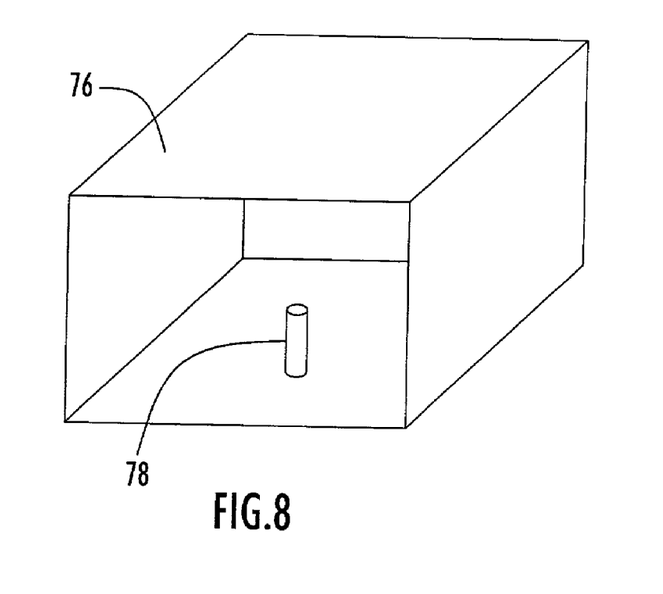
FIG. 8 is a schematic illustration of a waveguide segment, (e.g., an antenna feed) with an inwardly projecting post shaped narrow-band filter indicating element disposed within the waveguide, in accordance with the present invention.

The method and system of the present invention is also well suited for use with Waveguide structures; FIG. 7 is a schematic illustration of a waveguide segment 70, (e.g., for use as an antenna feed) with first and second iris aperture panel indicating elements 72, 74 disposed within the waveguide. FIG. 8 is a schematic illustration of a waveguide segment 76, (e.g., an antenna feed) with an inwardly projecting post-shaped narrow-band filter indicating element 78 disposed within the waveguide.

Generally, for use with an antenna having a wave guide feed structure, an indicating element or tag element is configured as something disposed in the wave guide physical structure that can be sensed. Typical wave guide (e.g., rectangular wave guide) is useful over a bandwidth spanning approximately 40% of the desired center frequency. Given that wave guide is not often used over more than 5% of that 40% for a dedicated application, a resonant structure configured inside the wave guide permits transmitter operation at the desired center frequency in an embodiment which provides a narrow pass band, e.g., 7 to 10% of what would otherwise have been a 40% bandwidth generously centered on the intended 1 to 4% of the frequency band being used by the transmitter.

Using 60 Gigahertz (GHz) as an example, a physical wave guide tuned for 60 GHz will customarily operate over 59 to 64 GHz and an industry standard wave guide servicing 60 GHz operates in the 50 to 75 GHz band. In the embodiment illustrated, wave guide 70 adapted to service 50 to 75 GHz it will be used at 60 GHz. The tag or sensing element is preferably configured as a rectangular, transverse, planar wafer 72 inserted in and filling the lumen of wave guide 70 and having an iris or hole 73 in the middle. The area of the hole 73 is preferably only 25% of the cross-sectional area of the rectangular wave guide and is exactly centered in the rectangular wave guide lumen area. The wafer is preferably conductive (e.g., metal).

A single iris indicating element can be used in accordance with the present invention, however, in the preferred embodiment, two wafers 72, 74 are disposed in series or sequentially down the wave guide lumen, whereupon the space 75 in between wafers 72, 74 define the center frequency and Quality or Q characteristics of a filter, as is well known in the art. By controlling the size of the iris in each wafer, one controls the bandwidth filter and by controlling the spacing between the wafers 75 one can control the number of sections or Q of the filter and set its center frequency.

The selected standard wave guide size of the present embodiment will have give a well-behaved, non-reflective response over the band 50 to 75 GHz. That wave guide, with the insertion of a pair of the irises, passes 60 plus or minus five GHz. For a radio system set to operate over seven bands, the center frequency is closer to 62 GHz. Set on 62 GHz, plus or minus a five GHz window, then, in accordance with the method of the present invention, a measurement downstream in the waveguide is useful for determining the identity of a connected antenna because the waveguide is very reflective at 55 GHz, due to the presence of the tag irises 72, 74 where otherwise the waveguide would exhibit a low VSWR at 55 GHz. Controller 64 executes a pre-programmed algorithm to perform method steps including receiving the indication of the effect of the tag irises 72, 74 and, in response, identifies the antenna by referring to an LUT in which the VSWR plot data and antenna identities are stored. Controller 64 then optionally controls or disables the transmitter output in response to the detection.

The measurement can be taken downstream of the iris(es) or can be a VSWR measurement back at the transmitter through use of a bi-directional coupler to sense VSWR at the transmitter and use the sensed VSWR as an identifier. A method for using an adjustable frequency signal source is preferably used to send signals at a range of frequencies into the waveguide antenna feed and determine, through VSWR measurements taken at each frequency, that energy passes at 60 GHz but not at, e.g., 65 GHz, to confirm that a recognized antenna type is connected (i.e., and not merely a broad band general purpose wave guide which would have passed energy at low VSWR for frequencies greater than 65 GHz). A variety of types of resonators can be used to make observable reflective resonances near or even in the transmitter output band. For example, if the desired band is 59–64 GHz but a given application will transmit data over only 59–61 GHz, a narrow band resonator configured as an inwardly projecting post-shaped member 78 is reflective only in a very narrow region, e.g., 63.5 GHz and the reflected band is only approximately 500 MegaHertz (MHZ) wide. In accordance with the method of this embodiment, the 500 MHZ reflective band is sensed and, in response, it is determined that the connected antenna is, e.g., antenna type A which has a gain of 10 dBi, and by sensing that post 78 is somewhere else in the waveguide feed it is determined that the connected antenna is e.g., antenna type C having a gain of 20 dBi.

It will be appreciated by those of skill in the art that the method and apparatus of the present invention makes available a transmission system with connectable antennae and capable of automatically sensing an indicator of a physical parameter of an antenna or automatically identifying an antenna, and optionally, in response thereto, automatically controlling a transmitter, receiver, transceiver or the like.

In the preferred embodiment, the transmission system or apparatus 10 comprises a transmitter 12 having a selectively variable output power at a frequency of interest and includes an electrical connector 14, as well as an antenna 16 having a feed 18 and providing a selected antenna gain (in the direction of maximum radiation at the frequency of interest). Antenna 16 further includes a connector 20 electrically connected to antenna feed 18 and adapted to make an electrical connection with the transmitter electrical connector 14. Antenna 16 further includes an indicating element 22 defining an antenna parameter such as antenna gain, where the indicating parameter corresponds to a selected antenna gain. Apparatus 10 also includes an indicating element sensor 24 adapted to sense indicating element 22 and generate a transmitter control signal in response thereto. Transmitter controller 26 is responsive to the transmitter control signal and is adapted to control the transmitter in response to the transmitter control signal.

In the preferred embodiment, indicating element 22 indicates antenna gain and comprises a resistive element 28 having a selected resistance value (e.g., 200 ohms) defining an antenna gain indicating parameter.

The method for automatically adjusting a transmitter output in accordance with the present invention comprises the steps of providing a transmitter 12 having a selectively variable output and including an electrical connector 4, an indicating element sensor 24 and a transmitter controller 26, providing an antenna 16 having a connector 20 and an indicating element 22 indicating an antenna parameter corresponding to a selected physical parameter of the antenna (e.g., gain); and connecting antenna 16 to transmitter 12 and thereby making an electrical connection between indicating element 22 and indicating element sensor 24. The next step is, preferably, sensing indicating element 22 with indicating element sensor 24 and generating a transmitter control signal in response thereto, and then controlling the transmitter's variable output in response to the transmitter control signal.

For purposes of nomenclature, it will be understood by those of skill in the art that the terminology used herein is exemplary, and not limiting, for example, transmitter 12 is, generally, any source of RF or microwave energy which may radiate through an antenna in a manner likely to be subject to government regulation. Similarly, transmitter electrical connector 14 may, as discussed above, be an "N" connector, a "BNC" connector or any other coupling structure adapted to receive a cooperating coupling structure for coupling first and second components to one another such as, for example, transmitter 12 and antenna 16. Alternatively, transmitter 12 and antenna 16 may be capacitively coupled, magnetically coupled, connected through a transformer, connected via a circulator or connected via a directional coupler, by way of example.

Antenna 16 is a structure adapted to receive microwave or RF energy and provide an impedance match between the output of transmitter 12 and free space (i.e., (377+j0) Ohms), as is well known in the art; Equivalent energy receiving structures include anything adapted to receive RF or microwave energy from a transmitter and attachable by electrical connector or coupling structure, as described above. Antenna feed 18 is a waveguide or transmission line-like structure adapted to receive the microwave or RF energy from transmitter 12. The method and structure of the present invention can be used in conjunction with any antenna structure; examples include monopoles, dipoles, loops, stripline patch structures, parabolic reflectors with any of a variety of well known configurations for antenna feed, as well as antenna structures including a plurality of director or reflector elements such as the Yagi-Uda array. In addition, as noted above, helically wound wire structures and other conductive structures can be fashioned as antennas for the purpose of radiating RF energy into free space. All of these antenna configurations have a variety of physical characteristics which can be defined or identified by use of indicating elements or tags for the purposes of the present invention.

Antenna physical characteristics amenable to indication using an indicating element 22 include optimum frequency of use, directivity, gain, efficiency, beam width, input impedance, antenna height, antenna width, antenna length, antenna weight and choice of materials.

As noted above, gain indicating element 22 can be any measurable structure and is preferably measurable electrically through the coupling formed through the transmitter connector and antenna connector so that the (e.g., gain) indicating element sensor, preferably resident in the transmitter housing, can automatically sense the gain indicating element using an electrical measurement based, in part, on voltage, current and variation of voltage and current as a function of time.

Transmitter output controller 26 receives the sensor output signal and, in response thereto, generates a transmitter control signal to control the output (e.g., power output) of the transmitter. Transmitter controller 26 preferably includes a microprocessor which is controllable by software preprogrammed with a sequence of steps preferably including detecting the presence of the antenna, detecting the presence of the sensor output signal, decoding the sensor output signal, computing (or deriving from the look up table) the appropriate transmitter output (in response to the computation or look up table entry).

As noted above, resistive element 28 is the preferred embodiment for indicating element 22 and can comprise a resistance component (i.e. a resistor) or can be a trimmable segment of resistive material screened or deposited onto a printed circuit board or other circuit supporting structure. Generally speaking, any form of resistive element 28 having the physical characteristic of resistance (measurable in ohms) can be adapted to serve as an indicating element, in accordance with the present invention.

Similarly, capacitor 36 can be a lumped circuit capacitor or can be a capacitive structure of conductive traces on one or two sides of a printed circuit board, or the like. Inductor 34 can be an inductive structure printed onto a printed circuit board or can be a lumped circuit element inductor having either a solid core or an air core. Indicating element 22 can also be a semiconductor, such as diode 30, shown in FIG. 2. Any other form of semiconductor or semiconductor circuit may be employed and a selected voltage-current (VI) characteristic value defines the antenna indicating parameter. For example, diode 30 may be a standard p/n junction diode, a zener diode, or a p-intricsic-n (PIN) diode having a desired VI characteristic such as forward voltage drop, to define the antenna indicating parameter.

In addition, indicating element 22 may also be a tuned circuit, such as LC circuit 32 shown in FIG. 2, or another form of active or passive tuned circuit, so long as a selected filter characteristic value adequately defines the necessary antenna indicating parameter. For example, if the tuned circuit is a low pass filter, it must have a selected filter characteristic value such as a 3 db down frequency which is (preferably) lower in frequency than the antenna's frequency of interest.

Having described preferred embodiments of a new and improved method and apparatus for automatically detecting an antenna physical parameter and adjusting a transmitter in response, it is believed that other modifications, variations and changes will be suggested to those skilled in the art in view of the teachings set forth herein. It is therefore to be understood that all such variations, modifications and changes are believed to fall within the scope of the present invention as defined by the appended claims.

The invention claimed is:

1. A transmission apparatus, comprising:
a transmitter having a selectively variable output power at a frequency of interest and including an electrical connector;
an antenna having a feed and providing a selected antenna gain in a direction of maximum radiation at said frequency of interest;
said antenna further including a connector electrically connected to the antenna feed and adapted to make an electrical connection with said transmitter electrical connector;
said antenna further including a gain indicating element defining an antenna gain indicating parameter, said gain indicating parameter corresponding to said selected antenna gain;
a gain indicating element sensor adapted to sense said gain indicating element and generate a sensor output signal in response thereto; and
a transmitter output power controller responsive to said sensor output signal and adapted to control said transmitter output power in response to said sensor output signal.

2. The transmission apparatus of claim 1, wherein said antenna gain indicating element comprises a resistive element having a selected resistance value defining an antenna gain indicating parameter.

3. The transmission apparatus of claim 1, wherein said antenna gain indicating element comprises a capacitor having a selected capacitance value defining an antenna gain indicating parameter.

4. The transmission apparatus of claim 1, wherein said antenna gain indicating element comprises an inductor having a selected inductive value defining an antenna gain indicating parameter.

5. The transmission apparatus of claim 1, wherein said antenna gain indicating element comprises a semiconductor having a selected VI characteristic value defining an antenna gain indicating parameter.

6. The transmission apparatus of claim 5, wherein said antenna gain indicating semiconductor comprises a diode having a selected forward voltage drop value defining an antenna gain indicating parameter.

7. The transmission apparatus of claim 1, wherein said antenna gain indicating element comprises a tuned circuit having a selected filter characteristic value defining an antenna gain indicating parameter.

8. The transmission apparatus of claim 7, wherein said antenna gain indicating tuned circuit comprises a low pass filter having a selected filter characteristic value comprising a three dB down frequency defining an antenna gain indicating parameter.

9. The transmission apparatus of claim 8, wherein said antenna gain indicating low pass filter three dB down frequency is lower than said antenna frequency of interest.

10. The transmission apparatus of claim 1, wherein said transmitter is capable of generating output power at first and second output power levels.

11. The transmission apparatus of claim 10, wherein said first output power level corresponds to a desired maximum electric field strength radiated from said antenna.

12. The transmission apparatus of claim 11, wherein said second output power level is substantially equal to zero output power, wherein said second output power level corresponds to a state in which the transmitter is disabled.

13. The transmission apparatus of claim 12, said transmitter output power controller being configured to receive said sensor output signal and determine whether a desired antenna having a desired gain is connected to said transmitter connector, and, if so, generate a transmitter control signal corresponding to a first state in response thereto;
said transmitter output power controller being configured to receive said sensor output signal and determine whether a desired antenna having a desired gain is connected to said transmitter connector, and, if not, generate a transmitter control signal corresponding to a second state in response thereto;
said transmitter control signal first state corresponding to said first output power level;

and said transmitter control signal second state corresponding to zero output power, wherein said transmitter is disabled.

14. A transmission apparatus, comprising:
a transmitter having a selectively variable output and including an electrical connector;
an antenna having a feed and providing a selected antenna physical parameter;
said antenna further including a connector electrically connected to the antenna feed and adapted to make an electrical connection with said transmitter electrical connector;
said antenna further including an indicating element indicating an antenna parameter, said antenna parameter corresponding to said selected antenna physical parameter;
an indicating element sensor adapted to sense said indicating element and generate a transmitter control signal in response thereto; and
a transmitter controller responsive to said transmitter control signal and adapted to control said transmitter in response to said transmitter control signal.

15. The transmission apparatus of claim 14, wherein said antenna indicating element comprises a resistive element having a selected resistance value indicating an antenna parameter.

16. The transmission apparatus of claim 14, wherein said antenna indicating element comprises a capacitor having a selected capacitance value indicating an antenna parameter.

17. The transmission apparatus of claim 14, wherein said antenna indicating element comprises an inductor having a selected inductive value indicating an antenna parameter.

18. The transmission apparatus of claim 14, wherein said antenna indicating element comprises a semiconductor having a selected VI characteristic value indicating an antenna parameter.

19. The transmission apparatus of claim 18, wherein said antenna indicating semiconductor comprises a diode having a selected forward voltage drop value indicating an antenna parameter.

20. The transmission apparatus of claim 14, wherein said antenna indicating element comprises a tuned circuit having a selected filter characteristic value indicating an antenna parameter.

21. The transmission apparatus of claim 20, wherein said antenna indicating tuned circuit comprises a low pass filter having a selected filter characteristic value comprising a three dB down frequency indicating an antenna parameter.

22. The transmission apparatus of claim 21, wherein said antenna operates optimally at a frequency of interest and said indicating low pass filter three dB down frequency is lower than said antenna frequency of interest.

23. The transmission apparatus of claim 14, wherein said transmitter has a selectively variable output power level, said power level being controllable in response to said transmitter control signal.

24. The transmission apparatus of claim 23, wherein said indicating element indicates the antenna parameter of gain, said antenna gain parameter corresponding to said selected antenna's gain in the direction of maximum radiation intensity at a frequency of interest.

25. The transmission apparatus of claim 14, wherein said indicating element comprises a resistance having a value in ohms which indicates said antenna parameter.

26. The transmission apparatus of claim 25, wherein said indicating element sensor comprises a current source and a voltage drop measuring circuit adapted to sense said resistance.

27. A method for automatically adjusting a transmitter output, comprising the steps of:
a) providing a transmitter having a selectively variable output and including an electrical connector, an indicating element sensor and a transmitter controller adapted to control said transmitter output;
b) providing an antenna having a connector adapted to make an electrical connection with said transmitter electrical connector and further including an indicating element indicating an antenna parameter, said antenna parameter corresponding to a selected physical parameter of said antenna; and
c) connecting said antenna to said transmitter and thereby making an electrical connection between said indicating element and said indicating element sensor.

28. The method for automatically adjusting a transmitter output of claim 27, further comprising the step of:
d) sensing said indicating element with said indicating element sensor and generating a transmitter control signal in response thereto.

29. The method for automatically adjusting a transmitter output of claim 28, further comprising the step of:
e) controlling said transmitter variable output in response to said transmitter control signal.

30. A transmission apparatus, comprising:
a transmitter having a selectively variable output and including a coupler;
an antenna having a waveguide feed and providing a selected antenna physical parameter;
said antenna further including a coupler coupled to the antenna waveguide feed and adapted to make a connection with said transmitter coupler;
said antenna further including an indicating element indicating an antenna parameter, said antenna parameter corresponding to said selected antenna physical parameter;
an indicating element sensor adapted to sense said indicating element and generate a transmitter control signal in response thereto; and
a transmitter controller responsive to said transmitter control signal and adapted to control said transmitter in response to said transmitter control signal.

31. The transmission apparatus of claim 30, wherein said antenna indicating element comprises a filter element disposed within said waveguide and having a filter value indicating an antenna parameter.

32. The transmission apparatus of claim 31, wherein said antenna indicating filter element comprises a first iris disposed within said waveguide and having a filter value indicating an antenna parameter.

33. The transmission apparatus of claim 32, wherein said antenna indicating filter element further comprises a second iris disposed within said waveguide and, together with said first iris, having a filter value indicating an antenna parameter.

34. The transmission apparatus of claim 31, wherein said antenna indicating filter element comprises a resonant post structure disposed within said waveguide and having a filter value indicating an antenna parameter.

35. The transmission apparatus of claim 30, wherein said indicating element sensor comprises at least one sensor to measure transmitted energy and reflected energy and compute Voltage Standing Wave Ratio therefrom.

36. A method for automatically identifying an antenna, comprising the steps of:
   a) providing a transmitter having a selectively variable frequency output and including a coupler, a Voltage Standing Wave Ratio sensor and a transmitter controller adapted to control said transmitter output;
   b) providing an antenna having a coupler adapted to couple with said transmitter coupler and having a known Voltage Standing Wave Ratio characteristic indicating the identity of said antenna;
   c) coupling said antenna to said transmitter and thereby making a connection between said antenna and said Voltage Standing Wave Ratio sensor; and
   d) sensing said antenna Voltage Standing Wave Ratio with said Voltage Standing Wave Ratio sensor and generating a transmitter control signal in response thereto.

37. The method for automatically adjusting a transmitter output of claim 36, further comprising the step of:
   e) controlling said transmitter variable output in response to said transmitter control signal.

* * * * *